United States Patent
Hoffmann

(10) Patent No.: US 7,070,875 B2
(45) Date of Patent: Jul. 4, 2006

(54) FUEL-CELL ASSEMBLY COMPRISING AN ELECTROLYTE RESERVOIR

(75) Inventor: Joachim Hoffmann, Dorfen (DE)

(73) Assignee: MTU CFC Solutions GmbH, Ottobrunn (DE)

( * ) Notice: Subject to any disclaimer, the term of this patent is extended or adjusted under 35 U.S.C. 154(b) by 399 days.

(21) Appl. No.: 10/296,591

(22) PCT Filed: May 23, 2001

(86) PCT No.: PCT/EP01/05917

§ 371 (c)(1),
(2), (4) Date: Jun. 5, 2003

(87) PCT Pub. No.: WO01/93359

PCT Pub. Date: Dec. 6, 2001

(65) Prior Publication Data
US 2003/0186103 A1    Oct. 2, 2003

(30) Foreign Application Priority Data
May 26, 2000 (DE) ............................... 100 26 206

(51) Int. Cl.
*H01M 2/00* (2006.01)
*H01M 4/86* (2006.01)
*H01M 8/14* (2006.01)

(52) U.S. Cl. ............................................. 429/34; 41/16

(58) Field of Classification Search .................. 429/16, 429/12, 25, 34, 41
See application file for complete search history.

(56) References Cited

U.S. PATENT DOCUMENTS 4,761,348 A     8/1988  Kunz et al. .................... 429/35
5,469,573 A  *  11/1995 McGill et al. ............... 717/127

OTHER PUBLICATIONS

International Search Report in English and German.
English Language Abstract of JP 61277169.
English Language Abstract of JP 01279571.

* cited by examiner

*Primary Examiner*—Patrick Joseph Ryan
*Assistant Examiner*—Thomas H. Parsons
(74) *Attorney, Agent, or Firm*—Crowell & Moring LLP

(57) ABSTRACT

A fuel cell assembly including a number of fuel cells (12) arranged in a stack (10). Each fuel cell contains an anode (1), a cathode (2) and a porous electrolyte matrix (3) arranged therebetween. An electrolyte reservoir (11), which compensates the electrolyte losses from the fuel cells (12) is provided at the end, or in the vicinity of the end of the fuel cell stack (10). The electrolyte is transported to the individual fuel cells (12) by electrical forces within the fuel cell stack (10). The electrolyte reservoir (11) is configured as a supporting structure which forms hollow chambers that contain porous bodies for absorbing the electrolyte in their pores.

19 Claims, 1 Drawing Sheet

FUEL-CELL ASSEMBLY COMPRISING AN ELECTROLYTE RESERVOIR

This application claims the priority of International Application No. PCT/EP01/05917, filed May 23, 2001 and German Application No. 100 26 206.6 filed May 26, 2000, the disclosures of which are expressly incorporated by reference herein.

BACKGROUND AND SUMMARY OF THE INVENTION

The invention relates to a fuel cell assembly which uses fuel cells arranged in a stack between end plates.

Fuel cell assemblies, especially assemblies of molten carbonate fuel cells, where a number of fuel cells, which each contain an anode, a cathode and a porous electrolyte matrix arranged between them, are arranged in the form of a fuel cell stack.

In molten carbonate fuel cells, mixtures of alkali carbonates are used as electrolyte, causing the fuel cells to be liquid at the operating temperature. The electrolyte is contained both in the porous electrolyte matrixes and in the anodes and cathodes of the fuel cells, which are likewise made of porous material, and is kept there with capillary force. The function and efficiency of a molten carbonate fuel cell are dependent upon the complete and correct filling of the electrolyte, which is accomplished during manufacturing by adhering to tight tolerance settings. Both over-filling and under-filling with electrolyte negatively influence the efficiency and durability of the cells.

During fuel cell operation, parts of the electrolyte contained in the cells are lost due to various mechanisms, and primarily the following mechanisms:

due to the strong wetting property of the molten alkali carbonates, the electrolyte has the tendency of creeping out of the cell in the fringe area and onto the orifices that are provided for supplying and removing fuel gas and oxidation gas, wherein it then spreads to the exterior surface of the fuel cell stack and the adjacent components;

the alkali carbonates of the electrolyte enter into chemical reactions with construction materials of the fuel cells, wherein a portion of the electrolyte is bonded with the resulting chemical compounds; and constituents of the alkali carbonates bond with water, which is created in the fuel cells as a reaction product, to form hydroxides, which evaporate at the operating temperature of the fuel cells.

The gradual electrolyte loss during the life of the fuel cell leads to a decrease in power and possibly limits the life of the fuel cell.

One possibility for overcoming the above-mentioned difficulties is to provide an electrolyte reservoir to compensate the electrolyte losses from the fuel cells.

For example, German Patent DE 195 45 658 A1 has a molten carbonate fuel cell where a porous body with an electrolyte supply is provided in at least one place to compensate electrolyte losses. This porous body forming the electrolyte supply is assigned to the individual fuel cell; in a fuel cell assembly having a number of fuel cells arranged in the form of a stack. Thus each individual fuel cell would be provided with such a porous body for maintaining a supply of electrolyte.

Japanese Patent JP 61074265 A uses a matrix configuration for a fuel cell where the electrolyte is being distributed in the matrix from an electrolyte reservoir that is assigned to the matrix in order to compensate losses. Here as well, in the case of a fuel cell configuration having a number of fuel cells that are arranged in the form of a stack, each matrix of the individual fuel cells would be equipped with such an electrolyte reservoir.

Further suggestions in which each individual fuel cell should be equipped with electrolyte reservoirs for compensating electrolyte losses are disclosed in U.S. Pat. No. 5,468,573, U.S. Pat. No. 4,185,145, U.S. Pat. No. 4,548,877 and Japanese Patent JP 61277169 A.

Furthermore U.S. Pat. No. 4,467,019 and JP 07326374 A have fuel cell assemblies with several fuel cells that are arranged in the form of a stack, where the electrolyte matrix of each fuel cell, respectively, is connected with an electrolyte reservoir that is provided outside the fuel cell stack for the purpose of compensating electrolyte losses that occur.

Additionally, U.S. Pat. No. 4,761,348 has a fuel cell assembly where the ends of the fuel cell stack, have respective electrolyte reservoirs—one with an excess of electrolyte and one with a lack of electrolyte—which are separated from the complete cells of the stack by impermeable, yet electrically conductive separators, but are subjected to an electrolyte exchange with the fuel cells.

The existing solution suggestions have many disadvantages. In the case of individual electrolyte reservoirs that are provided in each fuel cell, only a limited amount of electrolyte can be maintained without a considerable increase in volume and cost of the cells. In the case of devices for filling the electrolyte supply in the individual cells, it is very difficult to distribute the replenish quantity exactly among the individual cells within the stack and fill each individual cell correctly. Channels or lines for filling the electrolyte form paths for parasitic currents along the fuel cell stack which currents reduce the power of the fuel cell assembly and possibly destroy the fuel cell assembly.

Another difficulty in connection with the loss and replenishing of electrolyte for fuel cells that are arranged in a stack consists of the fact that the electrically charged particles of the electrolyte migrate in the direction of the opposite polarity under the influence of the electric field that is generated by the fuel cell tension along the stack. The alkali ions contained in the electrolyte therefore have the tendency of migrating from the positive end to the negative end of the fuel cell stack under the influence of the electric field. Thus, the rate of electrolyte loss in the cells on the positive end of the fuel cell stack is considerably higher than that of the cells on the opposite end. Constantly maintaining or replenishing electrolyte for all cells would then lead to overfilling the cells in the vicinity of the negative end of the fuel cell stack and insufficient filling on the positive end.

It is therefore an object of the present invention to create an improved fuel cell assembly of the type having an electrolyte reservoir.

The invention creates a fuel cell assembly having a number of fuel cells that are arranged in the form of a stack, wherein each cell contains electrodes in the form of an anode and a cathode and a porous electrolyte matrix arranged between them, as well as a current collector for contacting the electrodes, and wherein furthermore an electrolyte reservoir for compensating electrolyte losses from the fuel cells is provided. Pursuant to the invention, the electrolyte reservoir is arranged on or in the vicinity of an end of the fuel cell stack, wherein the electrolyte is transported to the individual fuel cells by electrical forces within the fuel cell stack, and wherein hollow chambers, which are formed by a supporting structure and which contain porous bodies absorbing the electrolyte in the pores, serves as the electrolyte reservoir.

A considerable advantage of the fuel cell assembly pursuant to the invention is that electrical forces acting in the fuel cell stack cause the electrolyte to be automatically supplied to various positions within the stack while being adapted to the different electrolyte loss rates. Another benefit is that the invented fuel cell assembly is easy and inexpensive to manufacture and easy to operate. Another advantage is the elimination of leakage currents. This elimination is possible due to the lack of lines or channels along the fuel cell stack for distributing the electrolyte from the outside among the individual fuel cells paths. Since the electrolyte reservoir contains a supporting structure, the material which absorbs the electrolyte directly is not required to assume the supporting function. The appropriate material is therefore mechanically relieved, which is beneficial with regard to its creep stability.

The electrolyte is preferably one component of a spreadable or flowing paste, which is introduced into the hollow chambers of the structure, wherein additional components of the paste, after curing, create a porous body whose pores contain the electrolyte. The supporting structure could be, for example, a current collector, which is installed on the positive end (in fuel cells the cathode) between the end plate and the last cell. Similarly, a large-pored foam structure can be provided as the supporting structure, where the pores are filled with paste. Alternatively the paste can be introduced into recesses or bore holes of the end plate so that the end plate itself serves as the supporting structure of the electrolyte reservoir.

Pursuant to another beneficial aspect of the invented fuel cell assembly the electrolyte reservoir is installed on one end of the fuel cell stack and an electrolyte-absorbing reservoir, in the form of a porous body for absorbing excess electrolyte, is provided on the other end of the fuel cell stack. Accordingly, due to the migration of electrolyte from the electrolyte reservoir to the other end of the fuel cell stack, any excess electrolyte is removed over time. The porous body for absorbing excess material can thus be designed the same as the electrolyte reservoir, with the corresponding benefits.

The electrolyte reservoir is preferably installed on the positive end of the fuel cell stack, and the electrolyte-absorbing reservoir for absorbing excess electrolyte is provided on the negative end of the fuel cell stack.

Pursuant to a beneficial development of the invented fuel cell assembly the electrolyte reservoir can be filled. Electrolyte losses occurring during operation of the fuel cell can thus be compensated so that a continuously optimal operation of the fuel cell assembly is feasible.

Preferably an electrolyte filling line, which is connected with the electrolyte reservoir and extends from the fuel cell stack to the outside, for filling the electrolyte reservoir from the outside is provided.

A preferred embodiment provides for the electrolyte filling line to have a vertical or outwardly ascending course.

Pursuant to a particularly beneficial embodiment of the invented fuel cell assembly, the electrolyte filling line is provided for filling the electrolyte, which exists in solid form at ambient temperature, preferably in the form of pellets, wherein the solid electrolyte at the operating temperature melts in the fuel cell stack and is received by the electrolyte reservoir.

The electrolyte reservoir consists of a porous body, whose pores are filled with the electrolyte. The pore size of the electrolyte reservoir is preferably larger than that of the pores of the electrolyte matrix. Therefore, capillary forces support the transport of electrolyte from the reservoir to the matrixes of the fuel cells.

Pursuant to a preferred embodiment of the invented fuel cell assembly, the porous body of the electrolyte reservoir consists of fuel cell cathode material that is completely impregnated with electrolyte.

Pursuant to another preferred embodiment of the invented fuel cell assembly, the supporting structure of the electrolyte reservoir consists of an electrically conductive material, which serves as the electrical connection between the last fuel cell and the end of the fuel cell stack.

Pursuant to a further beneficial embodiment of the invented fuel cell assembly it is provided that along the fuel cell stack between individual components of the fuel cells and/or the fuel cell stack existing capillary travel paths for the electrolyte are designed with regard to their thickness and/or their pore size such that an optimization of the electrolyte transport within the fuel cell stack from the electrolyte reservoir to the fuel cells takes place. Therefore the speed of transport and the type of distribution of electrolyte delivered from the electrolyte reservoir to the individual fuel cells can be optimized.

Pursuant to another preferred embodiment of the invented fuel cell assembly, means for monitoring the tension of the most positive fuel cell or a group of most positive fuel cells are provided and a decrease in this tension is used a signal for filling the electrolyte supply in the electrolyte reservoir. Because of the electrical forces within the fuel cell stack, the electrolyte loss of the fuel cells increases as forces are on the positive end of the fuel cell stack increase. The tension of one or more fuel cells on the positive end of the stack is a reliable signal for the necessity of replenishing the electrolyte supply.

Additionally according to another beneficial aspect of the invented fuel cell assembly, the electrolyte used to fill the electrolyte reservoir has a composition that differs from the initial composition of the electrolyte in the electrolyte matrixes of the fuel cells in order to compensate disproportionate electrolyte losses during the fuel cell operation. The electrolyte that is used for filling the electrolyte reservoir therefore contains those components that are lost at a higher rate during operation in higher concentrations than loses of the initial or normal composition of the electrolyte in the electrolyte matrixes.

The following describes examples of embodiments of the invented fuel cell assembly based on the drawings:

DETAILED DESCRIPTION OF THE PREFERRED EMBODIMENTS

Figure 1:
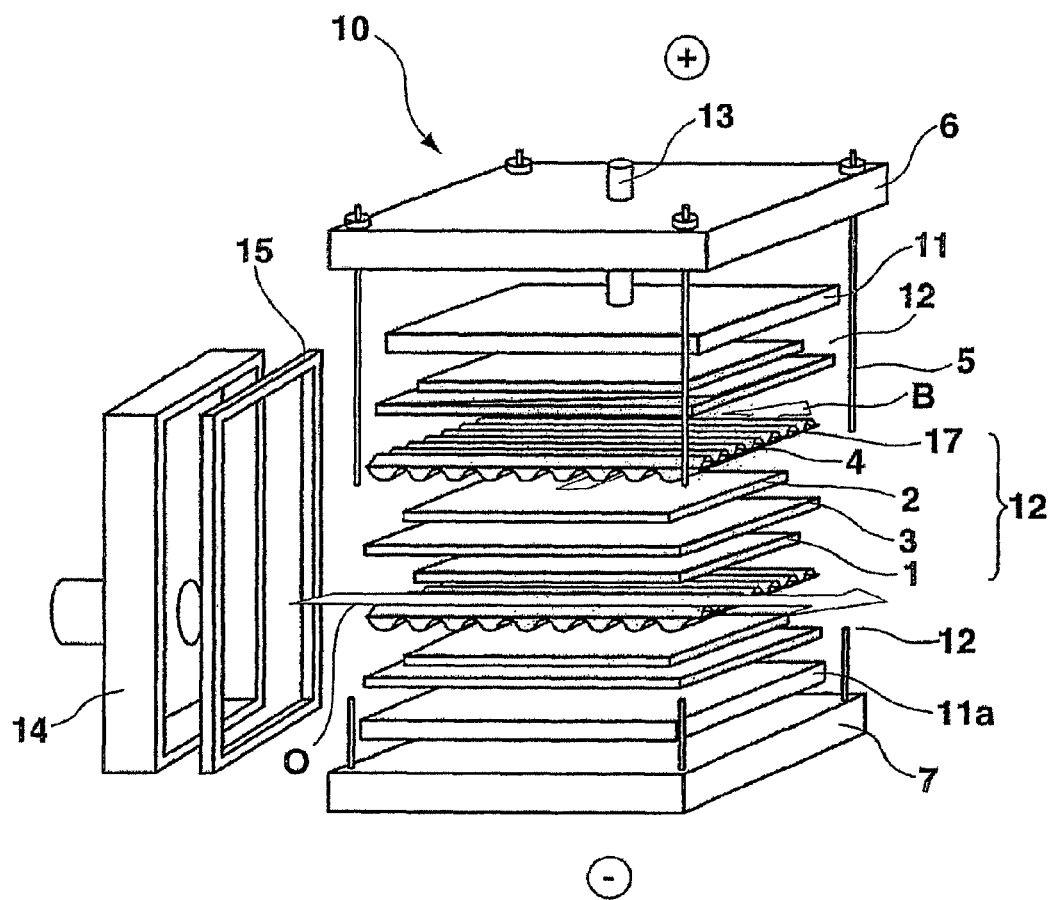
FIG. 1 shows a diagrammatic perspective exploded view of a fuel cell assembly with fuel cells that are arranged in the form of a stack pursuant to an example of the invention, wherein for the purpose of better clarity only a few of the fuel cells that make up the fuel cell stack are depicted.

In FIG. 1 the reference number 10 designates a fuel cell stack, which consists of a number of fuel cells 12, which each contain an anode 1, a cathode 2 and an electrolyte matrix 3 arranged between them. Adjacent fuel cells 12 are separated from each other by a bipolar plate 4 and adjoining current collectors 17, which serve the purpose of guiding the currents of a fuel gas B and an oxidation gas O separately via the anode 1 or via the cathode 2 of the fuel cells, wherein the anode 1 and the cathode 2 of adjacent fuel cells are separated from each other from a gas engineering point of view by the bipolar plate 4. The current collectors 17 ensure electrical contacting of the cells among each other.

The fuel cell stack 10, which contains a variety of such fuel cells 12, of which however only a few are shown in the figure for clarity reasons, is closed on its top and on its bottom, respectively, by an end plate 6, 7, wherein these end plates 6, 7 are connected with each other by rods 5 and are tensioned in relation to one another so that the individual fuel cells 12 are held against each other at a specified pressing force. On the exterior sides of the fuel cell stack gas distributors 14 are provided, which are sealed against the fuel cell stack 10 by gas distributor gaskets 15 and serve the purpose of feeding and removing currents of fuel gas B and oxidation gas O. For clarity reasons only one such gas distributor 14 including the gas distributor gasket 15 is shown in the FIG. 1.

On the upper end of the fuel cell stack 10, which corresponding to the orientation of the fuel cells 12 in relation to the position of their anode 1 and cathode 2 being the positive end of the fuel cell stack 10, an electrolyte reservoir 11 is arranged, which is located between the uppermost, i.e. the most positive fuel cell 12 and the upper end plate 6 of the fuel cell stack 10.

The electrolyte reservoir 11 consists of a supporting structure, in whose hollow chambers porous bodies 16 are arranged, the pores of which are filled with the electrolyte. The electrolyte is transported from the electrolyte reservoir 11 by electrical forces within the fuel cell stack 10 to the individual fuel cells 12 in order to compensate the electrolyte losses occurring there. In detail this takes place such that during operation of the fuel cell assembly the electrolyte, i.e. the ions contained in it, migrate via capillary paths or surface paths from the positive to the negative end of the fuel cell stack under the influence of the electric field existing within the fuel cell stack. The paths can e.g. be on gasket surfaces with external gas distributors or the surfaces of gas distribution channels within the stack in the case of a fuel cell assembly with internal gas distribution.

The supporting structure is preferably a current collector 4a, which is arranged between the end plate 6 and the last fuel cell 12 of the stack. Alternatively the supporting structure consists of structural foam with macro-pores. A paste, which can be cast or spread, is filled into the hollow chambers of the current collector or structural foam. The paste consists of powdery starting substances, which are mixed with a liquid binding agent. A curing process creates a porous body 16, whose pores hold the electrolyte.

The pore size of the porous body 16 holding the electrolyte is larger than the size of the pores of the electrolyte matrix 3 of the fuel cells so that due to the ratio of the capillary retaining forces, which act upon the electrolyte, between the electrolyte reservoir 11 and electrolyte matrixes 3 of the fuel cells 12 the electrolyte, migrating along the fuel cell stack 10, will have its source in the electrolyte reservoir 11 instead of in the active fuel cell components. On the other hand, due to the capillary forces, any deficiency of electrolyte in the matrixes and/or electrodes of the fuel cells will be filled from the small, yet constant electrolyte quantity migrating from the electrolyte reservoir 11 until all small pores of the matrix 3 and/or the electrodes 1, 2 have been filled.

The porous body 16 of the electrolyte reservoir 11 consists preferably of the material of the fuel cell cathodes, which is completely impregnated with electrolyte. The porous body 16 can also be inserted or filled into the hollow chambers in the form of cured molded pieces. Preferably however a paste-like mass is inserted, which when exposed to air cures within a short period of time while forming pores. The composition of the electrolyte maintained in the electrolyte reservoir 11 can be that of the electrolyte that was introduced into the electrolyte matrixes during the manufacture of the fuel cells; preferably the electrolyte reservoir 11 however is filled with electrolyte that differs from the initial composition of the electrolyte in the matrixes 3 of the fuel cells 12 in order to compensate disproportionate electrolyte losses during fuel cell operation. This means that the electrolyte in the electrolyte reservoir 11 contains those components to a higher percentage that are lost more quickly during fuel cell operation.

The capillary travel paths serving the distribution of electrolyte throughout the fuel cell stack 10 are dimensioned with regard to their thickness and/or pore size such that the electrolyte transport from the electrolyte reservoir 11 to the fuel cells 12 is optimized so that the electrolyte quantity transported via these paths largely corresponds to the electrolyte quantity that is lost in the fuel cells 12.

An electrolyte filling line 13, which extends outward from the fuel cell stack 10 and serves the purpose of filling the electrolyte reservoir 11, is connected with the electrolyte reservoir 11. On the inside, this electrolyte filling line 13 is in contact with the porous body of the electrolyte reservoir 11 and has an ascending or vertical course upward to the outside. The electrolyte filling line 13 is provided for replenishing electrolyte, which exists in solid form at ambient temperature, preferably in the form of pellets, which can be filled into filling line 13, drop into the interior of the fuel cell stack 10 and melt at the operating temperature existing there, and can be absorbed under the effect of the capillary forces of the porous body forming the electrolyte reservoir 11. The quantity and frequency with which the electrolyte must be replenished via the filling line 13 can be calculated from experimental data and experience values in respect of typical electrolyte loss in the affected fuel cell stack.

Since the supporting structure of the electrolyte reservoir 11 preferably consists of an electrically conductive material, it can be used simultaneously for contacting the last fuel cell on the positive end of the fuel cell stack 10, specifically for contacting the cathode 2 of the fuel cell 12 located on the positive end of the fuel cell stack 10. On the other end of the fuel cell stack 10 additionally a corresponding structure with a porous body, an electrolyte-absorbing reservoir 11a for absorbing excess electrolyte, can be provided.

Figure 2:
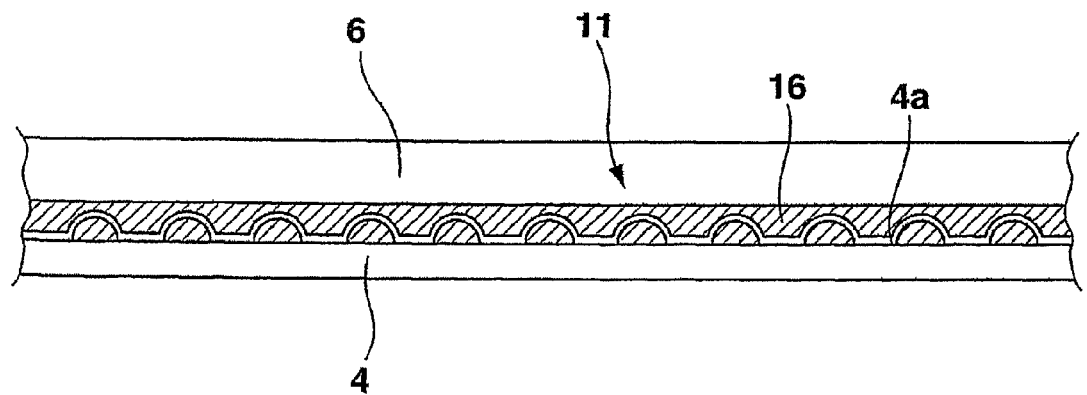
FIG. 2 shows an enlarged side cross-sectional view of a current collector, in whose hollow chambers pursuant to another preferred example of an embodiment of the invention the electrolyte reservoir is provided with a porous body for absorbing excess electrolyte.

Pursuant to the example shown in FIG. 2, the electrolyte reservoir 11 exists in a current collector 4a, whose hollow chambers are filled with a porous body 16. This current collector 4a is located between an end plate 6 and a bipolar plate 4 of the adjacent last cell, i.e. on the positive end of the fuel cell stack 10. A current collector is located between the bipolar plate 4 and cathode 2 of the adjoining cell, however for clarity reasons it is not shown in FIG. 1. The electrolyte reservoir on the other end of the fuel cell stack 10 can be designed accordingly.

Pursuant to an alternative embodiment, the hollow chambers for absorbing a spreadable and flowing paste for the purpose of forming a porous body can also be designed as recesses or bore holes in the end plates 6, 7.

The reservoir 11a for absorbing excess electrolyte can, preferably like the electrolyte reservoir 11, be formed by pouring a flowing mass into a current collector 4a. For the manufacture of the electrolyte reservoir, this mass consists e.g. of a ceramic powder (pore formation), the electrolyte material and a binding agent and/or solvent, or for the manufacture of the body absorbing excess electrolyte e.g. of a ceramic powder (pore formation) and a binding agent and/or solvent, however not, or only to a very limited extent, of the electrolyte material, which then only assumes the function of a high-temperature adhesive for the ceramic particles. After curing the binding agent, the current collector 4a equipped with the electrolyte reservoir 11 can be installed on the positive end of the fuel cell stack 10, or the electrolyte-absorbing reservoir 11a absorbing excess electrolyte can be installed on the negative end of the fuel cell stack 10.

Information as to whether the electrolyte supply in the electrolyte reservoir 11 is still sufficient is obtained by monitoring the tension of the most positive fuel cell, i.e. the fuel cell which is located on the positive end of the fuel cell stack 10 or a group of fuel cells on this end of the fuel cell stack 10. A drop in tension is used as a signal for replenishing the electrolyte supply in the electrolyte reservoir 11 via the filling line 13. A decrease in electrolyte in a fuel cell leads to a drop in the fuel cell tension and can thus be interpreted as a representative signal for an electrolyte loss from the fuel cell. Because of the electric field existing in a fuel cell stack, the fuel cells located on the positive end of the fuel cell stack 10 are subject to the larger electrolyte loss. The monitoring of tension of one or more cells located on the positive end of the fuel cell stack 10 is a suitable means for gaining an appropriate signal for filling the electrolyte.

| Number Designation List | |
|---|---|
| 1 | anode |
| 2 | cathode |
| 3 | electrolyte matrix |
| 4 | bipolar plate |
| 4a | current collector |
| 5 | rod |
| 6 | end plate |
| 7 | end plate |
| 10 | fuel cell stack |
| 11 | electrolyte reservoir |
| 11a | electrolyte-absorbing reservoir |
| 12 | fuel cell |
| 13 | filling line |
| 14 | gas distributor |
| 15 | gas distributor gasket |
| 16 | porous body |
| B | fuel gas |
| O | oxidation gas |

The invention claimed is:

1. A fuel cell assembly comprising;
a plurality of fuel cells arranged in the form of a stack between first and second end plates, each of said fuel cells including an anode electrode, a cathode and a porous electrolyte matrix arranged between said anode and cathode electrode;
a plurality of pairs of current collectors and bipolar plates wherein each one of said pairs is arranged between adjacent fuel cells in said stack;
an electrolyte reservoir for compensating electrolyte losses from said plurality of fuel cells, said electrolyte reservoir positioned in the vicinity of one end of said fuel stack and said reservoir including a plurality of hollow chambers wherein the electrolyte is introduced into said hollow chambers as a component of a spreadable or flowing paste, wherein additional components of the paste result in a porous body after curing.

2. The fuel cell assembly pursuant to claim 1, wherein the paste is created by stirring powdery starting substances with a liquid binding agent.

3. The fuel cell assembly pursuant to claim 1, wherein the electrolyte reservoir consists of a structure, which forms hollow chambers and is located between the end plate and the last cell on the positive end of the fuel cell stack.

4. The fuel cell assembly pursuant to claim 1, wherein one of said current collector is used as the structure forming the hollow chambers.

5. The fuel cell assembly pursuant to claim 1, wherein a foam structure with macro-pores serves as the structure forming the hollow chambers.

6. The fuel cell assembly pursuant to claim 1, wherein the hollow chambers are designed in the first and second end plates in the form of recesses or bore holes.

7. The fuel cell assembly pursuant to claim 1, wherein an electrolyte-absorbing reservoir for absorbing excess electrolyte on another end of said fuel cell stack.

8. The fuel cell assembly pursuant to claim 7, wherein the electrolyte reservoir is installed on a positive end of the fuel cell stack and that the electrolyte-absorbing reservoir for absorbing excess electrolyte is provided on a negative end of the fuel cell stack.

9. The fuel cell assembly pursuant to claim 7, wherein the electrolyte-absorbing reservoir for absorbing excess electrolyte is formed by pouring in a flowing mass, which, after curing, forms a porous body.

10. The fuel cell assembly pursuant to claim 1, wherein the electrolyte reservoir is filled.

11. The fuel cell assembly pursuant to claim 10, wherein an electrolyte filling line, which is connected with the electrolyte reservoir and extends outward from the fuel cell stack, is provided for filling the electrolyte reservoir from the outside.

12. The fuel cell assembly pursuant to claim 11, wherein the electrolyte filling line has a vertical or outwardly ascending course.

13. The fuel cell assembly pursuant to claim 11, wherein the electrolyte filling line is provided for replenishing the electrolyte, which exists in solid form at ambient temperature, wherein the solid electrolyte at operating temperature melts in the fuel cell stack and is absorbed by the electrolyte reservoir.

14. The fuel cell assembly pursuant to claim 1, wherein the pore size of the electrolyte reservoir is larger than that of the pores of the electrolyte matrix.

15. The fuel cell assembly pursuant to claim 1, wherein the porous body of the electrolyte reservoir consists of fuel cell cathode material, which has been completely impregnated with electrolyte.

16. The fuel cell assembly pursuant to claim 1, wherein a structure of the electrolyte reservoir forming the hollow chambers consists of an electrically conductive material.

17. The fuel cell assembly pursuant to claim 1, wherein capillary travel paths for the electrolytes existing along the fuel cell stack between individual components of at least one of the fuel cells and of the fuel cell stack are designed such with respect to at least one of their thickness and/or their pore size so as to optimize the electrolyte transport within the fuel cell stack from the electrolyte reservoir to the fuel cells.

18. The fuel cell assembly pursuant to claim 1, further including means for monitoring the tension of the most positive fuel cell or a group of most positive fuel cells are provided and wherein a decrease in tension is interpreted as a signal for replenishing the electrolyte supply in the electrolyte reservoir.

19. The fuel cell assembly pursuant to claim 1, wherein the electrolyte in the electrolyte reservoir is replenished in a composition that differs from the initial composition of the electrolyte in the electrolyte matrixes of the fuel cells in order to compensate disproportionate electrolyte losses during fuel cell operation.

* * * * *